Feb. 21, 1950        G. K. NEWELL        2,498,501
FRICTION BRAKING ELEMENT FOR DISK BRAKES
Filed Aug. 26, 1948
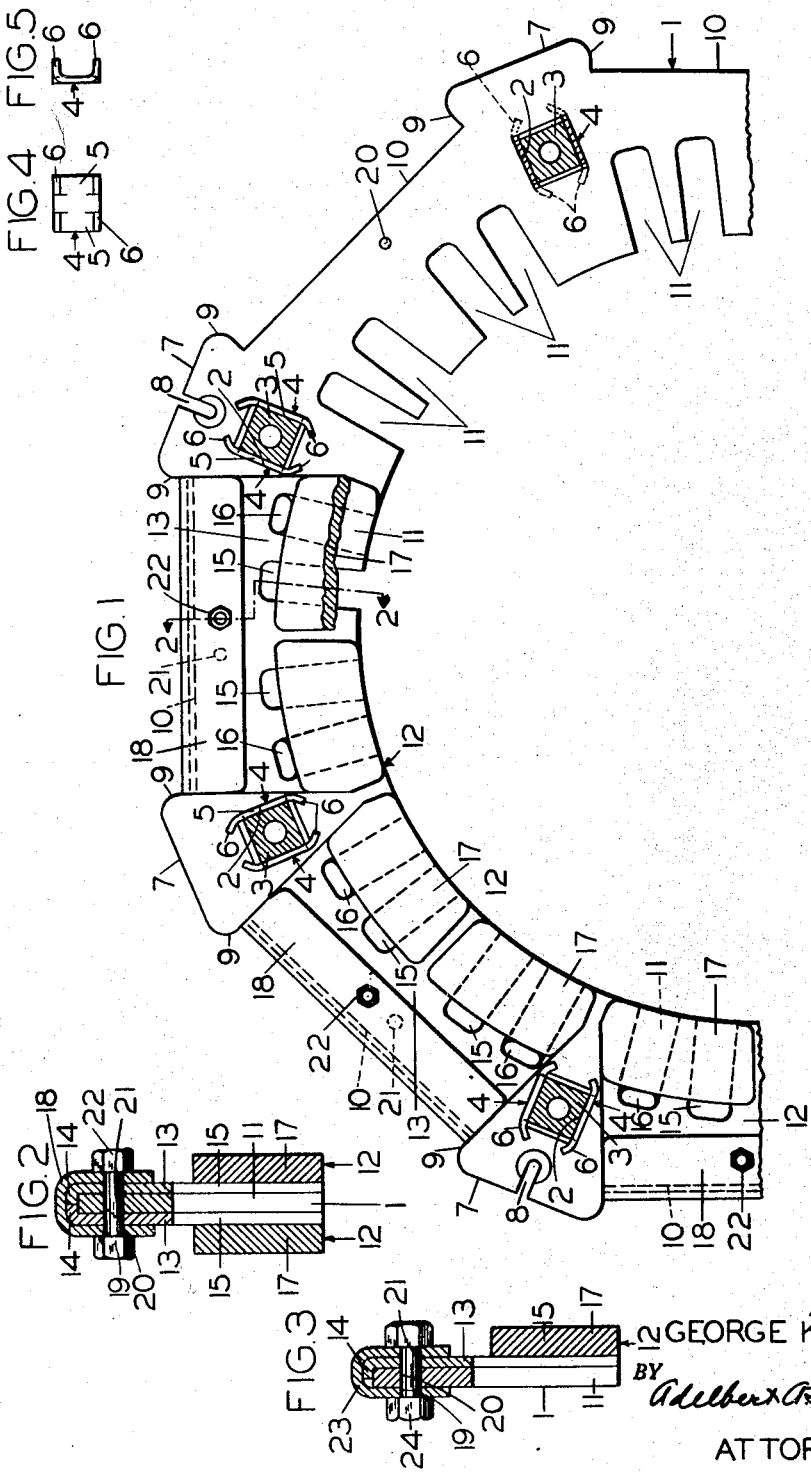
INVENTOR.
GEORGE K. NEWELL
BY Adelbert A. Steinmiller
ATTORNEY Patented Feb. 21, 1950

2,498,501

UNITED STATES PATENT OFFICE 2,498,501

FRICTION BRAKING ELEMENT FOR DISK BRAKES

George K. Newell, near Pitcairn, Pa., assignor to The Westinghouse Air Brake Company, Wilmerding, Pa., a corporation of Pennsylvania Application August 26, 1948, Serial No. 46,208

6 Claims. (Cl. 188—250)

This invention relates to disk brake apparatus and more particularly to a friction brake element therefor.

In the copending application of Joseph C. McCune, Serial No. 43,913, filed August 12, 1948, and assigned to the assignee of the present application there is disclosed a disc brake apparatus embodying a pair of annular brake rotors interleaved with three annular brake stators. The rotors are secured to rotate with a vehicle wheel while the stators are carried by a plurality of spaced apart tie rods of square cross section which are secured against rotation, two of the stators being slidable axially on said rods. Each of the stators is fabricated from a plurality of steel segments secured in substantial end to end relation, each segment being provided on one side with a plurality of brake shoes for frictional braking contact with the adjacent face of a rotor. When the brake shoes on the stators are worn out, it is necessary to partially disassemble the brake apparatus axially in order to gain access to the stators for breaking an overlapping joint and for then spreading the joint to pass over the wheel axle whereupon the worn stator will be scrapped and replaced with a new stator.

One object of the invention is the provision of an improved stator for a disc brake apparatus of the above type which does not require any disassembling of the brake apparatus for renewal or replacement of worn brake shoes.

Another object of the invention is the provision of a stator for a disc brake apparatus involving smaller renewable parts to minimize cost of maintenance and storage space for repairs, as compared to the structure disclosed in the above mentioned McCune application.

Other objects and advantages will become apparent from the following more detailed description of the invention.

In the accompanying drawing: Fig. 1 is a side view of a portion of a brake stator constructed in accordance with the invention; Fig. 2 is a cross-sectional view of a brake stator such as shown in Fig. 1 having oppositely arranged braking faces; Fig. 3 is a view similar to Fig. 2 but of a stator having a single braking face; Fig. 4 is a plan view of a wear element adapted to be associated with the stator shown in Fig. 1; and Fig. 5 is a side view of said wear element.

Description

As shown in the drawing, the improved brake stator comprises an unbroken annular or ring-like support plate 1 (only about half of said plate being shown in the drawing) preferably pressed from sheet steel and provided between its inner and outer edges with a plurality of spaced apart rectangular openings 2 through which square tie rods 3 are adapted to project for holding the stator against rotation and upon the parallel, generally radially extending sides of which said stator is adapted to slide in effecting an application and release of brakes in a manner described in the copending application above referred to. The support plate or ring 1 is adapted to be a permanent part of the brake apparatus, i. e., it is not intended that it be replaced upon renewing brake shoes which will be later described. To prevent wear of the stator at the tie rods 3 I therefore insert between each of the parallel and substantially radially extending sides of each tie rod and the adjacent side wall of the respective plate opening 2 a renewable wear element 4. Each element 4 is provided at each of its opposite ends with a portion 5 disposed beyond or outside the plate 1 and the opposite ends 6 of each portion 5 are bent outwardly over the adjacent face of said plate for holding the element in position. The wear element 4 is shown in plan in Fig. 4 and in side elevation in Fig. 5 prior to assembling into a plate opening 2. It will be apparent that the wear element 4 will prevent wear of the plate 1 on the tie rods 4. The plate 1 at openings 2 therefore will never be subject to such wear and will last indefinitely, while renewal of worn wear elements 4 will render plate 1 like new in this respect.

Projecting from the outer edge of the plate 1 in line with each of the openings 2 is a lug or ear 7 every alternate one of which is provided with a slot 8 open to the outer edge of the plate for receiving a stator release spring connecting means (not shown) described in the copending application hereinbefore mentioned. The two adjacent sides 9 of each pair of lugs 7 are arranged substantially parallel to a radius of the plate extending midway between said sides and at right angles to a connecting edge portion 10 of the ring. The plate 1 has four slots 11 disposed in the portion between each adjacent pair of openings 2 and opening to the inner edge of said plate.

According to whether the stator will be used as an intermediate or end brake element of a pile, a removable braking element 12 is provided for application to each of the opposite sides of the stator plate 1, as shown in Fig. 2, or to only one side as shown in Fig. 3, between each adjacent pair of lugs 7.

Each braking element 12 comprises a backing plate 13 preferably stamped from steel plate and having at one edge an outturned strengthening and centering lip 14 adapted to partially overlap and engage the edge portion 10 of plate 1 and substantially engage the adjacent sides 9 of adjacent lugs 7. Each plate 13 has two slots 15 open to its inner edge and adapted to match up with the center two of the four slots 11 provided in the ring 1 between the respective lugs 7, and at opposite sides of the two slots 15 the plate has openings 16 for matching with the inner ends of the other two of said four slots 11. Secured by welding to the side of each plate 13 opposite the rib 14 are two spaced apart friction brake shoes 17 for frictional braking contact with a brake rotor (not shown). The inner peripheral edges of the two shoes 17 are aligned with the inner peripheral edge of the plate 13, and the radial width of the shoes is less than the length of slots 11 in the ring 1 and slots 15 in the plate, so that the inner ends of the matching slots 11 and 15 are open to atmosphere, while the other slots 11 are also open to atmosphere through the openings 16, thereby providing four passages for flow of cooling air currents back of the brake shoes 17 to dissipate heat of braking from said shoes.

If the stator is to be employed between two rotors of a disc brake apparatus and therefore will require braking surfaces on each of its opposite sides (Fig. 2), two oppositely arranged brake elements 12 will be mounted on the opposite sides of plate 1 between each adjacent pair of lugs 7 with the lip 14 of said elements in contact with the edge 10 of the plate. A U-shaped clip 18 will then be applied over the opposite sides of the two backing plates 13 of each oppositely arranged pair of brake elements into contact with the respective lips 14 and also in contact at opposite ends with sides 9 of the respective pair of lugs 7. In this position of the clip 18 an opening 19 therethrough in each of its legs will align with an opening 20 in the plate 1 and with one or another of two openings 21 in the backing plates 13 of the respective brake elements 12 and through these aligned openings a bolt 22 will be applied to rigidly secure each oppositely arranged pair of brake elements 12 to the plate 1.

If on the other hand the stator is to be employed at one end of a pile of brake discs it will require braking surfaces on one side only (Fig. 3) in which case a brake element 12 will be applied to only one side of the plate 1 between each adjacent pair of lugs 7 and secured thereto by a clip 23 and bolt 24.

The holes 20 in the plate 1 are disposed closer to one of the adjacent lugs 7 than to the other, so that two adjacent stators may be assembled in a pile of brake elements with the bolts 22, 24 out of alignments, i. e., so that they will not contact each other in applying the brakes and will thereby permit substantial complete wearing away of the brake shoes 17. The two holes 21 are provided in each backing plate 13 to ensure one matching with the plate hole 20 when the brake elements 12 are applied to opposite sides of the plate 1.

The sides 9 of each adjacent pair of lugs 7 are arranged parallel to center the respective braking element or elements 12, and engagement therewith of the opposite ends of the lip 14 of the respective backing plate or plates 13 will take thrust of braking force applied to the brake shoes 17. The lips 14 also aid in locating the braking elements on the plate 1. The clips 18 or 23 facilitate application particularly of an oppositely arranged pair of brake elements to the plate 1 and also serve to strengthen the respective backing plate or plates 13 against buckling under braking forces applied to shoes 17.

Since the plate 1 is a permanent part of the brake apparatus, as well as the clips 18, 23 and bolts 22, 24, all that need be carried in stock for repairing the brake stator are the brake elements 12 and wear elements 4. When it becomes necessary to renew the brake elements 12 of a stator all that is necessary is to remove the bolts 22 or 24, clips 18 or 22 and then the worn brake elements, and then insert new brake elements 12 and reapply the clips and bolts and this work can be accomplished from the side of the brake apparatus and without effect on any other parts of the apparatus. If it is desired to replace the wear elements 4 the ends 6 of one portion 5 of the worn elements may be broken off to permit removal of the worn elements, and new elements 4 may be then inserted and the ends 6 thereof bent outwardly to overlap the adjacent face of the plate 1, it being noted that there is clearance at the radially opposite sides of the tie rods 3 and walls of openings 2 to permit a new wear element, constructed as shown in Figs. 4 and 5, to be slipped into position.

Having now described the invention, what I claim as new and desire to secure by Letters Patent, is:

1. An annular friction brake element for a disc type of brake apparatus comprising a ring-like support plate, a plurality of segment-like backing plates spaced from each other around one side of said support plate, friction brake shoe means secured to each of said backing plates adjacent the inner peripheral edge thereof, securing means adjacent the outer peripheral edge of each backing plate removably securing the backing plate to said support plate, a plurality of slots through each backing plate extending generally radially of said support plate and open to the inner edge of the backing plate and extending past and open to the opposite edge of the brake shoe means, and registering slots in said support plate open to the inner peripheral edge thereof.

2. An annular friction brake element for a disc type of brake apparatus comprising a ring-like support plate, a plurality of segment-like backing plates spaced from each other around one side of said support plate, securing means adjacent the outer edge of each backing plate removably securing the backing plate to said support plate, said support plate and each backing plate having generally radially extending registering slots open at one end to the inner peripheral edges thereof, and friction brake shoe means of less radial width than the length of said slots bridging said slots and secured to each backing plate adjacent the inner edge thereof.

3. An annular friction brake element for a disc type of brake apparatus comprising a ring-like support plate, a plurality of segment-like backing plates spaced from each other around one side of said support plate, securing means adjacent the outer edge of each backing plate removably securing the backing plate to said support plate, said support plate having a plurality of through generally radially extending slots open at one end to the inner peripheral edge of said support plate, and each backing plate having adjacent each end a through opening for registry with the opposite end of certain of said slots and having between the two openings a plurality of through slots open to the inner peripheral edge thereof and registering with the other slots in said support plate, and a plurality of friction brake shoes of less width than the length of said slots spaced from each other and secured to each backing plate adjacent the inner edge thereof.

4. An annular friction brake element for a disc type brake apparatus comprising a ring-like support plate, a plurality of lugs spaced around and projecting from the outer edge of said support plate, a plurality of backing plates spaced from each other around and having one side in engagement with one side of said support plate and having at one edge a lip overlapping and in contact with the peripheral portion of said stator plate between an adjacent pair of such lugs, a U-shaped clip disposed over the outer edge of said stator and each backing plate, a bolt extending through each of said clips and the confined portion of said support plate and the respective backing plate removably securing the backing plate to said support plate, and friction brake shoe means secured to the side of each backing plate opposite that engaging said support plate.

5. An annular friction brake element for a disc type brake apparatus comprising a ring-like support plate, a plurality of lugs spaced around and projecting from the outer edge of said support plate, a plurality of oppositely arranged pairs of backing plates spaced around said support plate with the backing plates of each pair engaging opposite sides of said support plate, and each backing plate comprising a lip overlapping and in contact with the outer peripheral edge of the support plate between the respective adjacent pair of said lugs, a U-shaped clip disposed over the outer edge of said support plate and opposite sides of each pair of backing plates, a bolt extending through each clip and the confined stator and backing plates removably securing the backing plates to said support plate, and friction brake shoe means secured to the side of each backing plate opposite the side contacting said support plate.

6. An annular friction brake element for a disc brake apparatus comprising a ring-like support plate, a plurality of spaced lugs arranged around and projecting from the outer edge of said support plate and each adjacent pair of lugs having adjacent faces arranged parallel to a radius of said support plate midway between said faces, a plurality of backing plates arranged around said support plate in contact with one side thereof and each backing plate having a lip overlapping and in contact with the peripheral edge of said support plate between an adjacent pair of said lugs and said lip being in substantial contact at its ends with the adjacent parallel faces of said adjacent pair of lugs, a U-shaped clip disposed over each backing plate and adjacent portion of said support plate with its opposite ends in substantial contact with the adjacent parallel faces of the respective adjacent pair of lugs, securing means removably securing each clip and the respective backing plate to said support plate, and friction brake shoe means secured to the side of said backing plate opposite that engaging said support plate.

GEORGE K. NEWELL.

REFERENCES CITED

The following references are of record in the file of this patent:

UNITED STATES PATENTS

| Number | Name | Date |
| --- | --- | --- |
| 672,800 | Newson | Apr. 23, 1901 |
| 1,493,237 | Birkigt | May 6, 1924 |
| 1,510,123 | Wemp | Sept. 30, 1924 |
| 1,913,802 | Gregory | June 13, 1933 |
| 2,015,890 | Gottschalk | Oct. 1, 1935 |
| 2,165,978 | Miller | July 11, 1939 |
| 2,218,615 | McCune | Oct. 22, 1940 |
| 2,247,298 | Kattwinkel | June 24, 1941 |
| 2,266,059 | Millan | Dec. 16, 1941 |